US010798752B2

(12) United States Patent
Jin et al.

(10) Patent No.: US 10,798,752 B2
(45) Date of Patent: Oct. 6, 2020

(54) METHOD AND DEVICE FOR EXECUTING EMERGENCY CALL (71) Applicant: Huawei Technologies Co., Ltd., Shenzhen, Guangdong (CN)

(72) Inventors: Hui Jin, Beijing (CN); Bo Zhang, Beijing (CN); Xianglei Xin, Shenzhen (CN); Lei Fu, Beijing (CN); Xiaoyan Duan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 4 days.

(21) Appl. No.: 15/528,303

(22) PCT Filed: Nov. 21, 2014

(86) PCT No.: PCT/CN2014/091915
§ 371 (c)(1),
(2) Date: May 19, 2017

(87) PCT Pub. No.: WO2016/078086
PCT Pub. Date: May 26, 2016

(65) Prior Publication Data
US 2018/0338334 A1 Nov. 22, 2018

(51) Int. Cl.
*H04W 4/90* (2018.01)
*H04W 4/44* (2018.01)
(Continued)

(52) U.S. Cl.
CPC .......... *H04W 76/10* (2018.02); *G08B 25/004* (2013.01); *G08B 25/016* (2013.01); *H04M 3/46* (2013.01);
(Continued)

(58) Field of Classification Search
CPC ... H04W 60/005; H04W 12/08; H04W 76/07; H04W 4/22; H04W 4/90; H04W 4/02;
(Continued)

(56) References Cited

U.S. PATENT DOCUMENTS 5,509,010 A * 4/1996 La Porta ............ H04Q 11/0457
370/397
6,069,948 A * 5/2000 Yrjana .................... H04L 12/52
379/201.01
(Continued)

FOREIGN PATENT DOCUMENTS

CN 1520132 A 8/2004
CN 1664872 A 9/2005
(Continued)

*Primary Examiner* — William D Cumming
(74) *Attorney, Agent, or Firm* — Kilpatrick Townsend & Stockton LLP (57) ABSTRACT A method includes: receiving an emergency call request; initiating, according to the emergency call request, n emergency calls by simultaneously using n call modes, where n is an integer not less than 2; and when a connection is established for one of the n emergency calls, releasing other emergency calls for which no connection has been established. By means of the embodiments of the present invention, multiple emergency calls may be simultaneously made, and when any one of the multiple emergency calls is connected, other emergency calls are released, reducing an emergency call time.

12 Claims, 3 Drawing Sheets (51) Int. Cl.
*H04W 76/50* (2018.01)
*H04W 76/10* (2018.01)
*H04M 3/46* (2006.01)
*H04W 36/28* (2009.01)
*G08B 25/00* (2006.01)
*G08B 25/01* (2006.01)
*H04M 3/51* (2006.01)
*H04W 36/00* (2009.01)
*H04W 76/30* (2018.01)

(52) U.S. Cl.
CPC ........... *H04M 3/5116* (2013.01); *H04W 4/90* (2018.02); *H04W 36/28* (2013.01); *H04W 76/50* (2018.02); *H04W 36/0022* (2013.01); *H04W 76/30* (2018.02)

(58) Field of Classification Search
CPC ....... H04W 4/029; H04W 76/50; H04W 4/44; G06F 17/60; G06F 13/00; H04M 3/48; H04M 3/42; H04L 12/12; G07C 5/008
USPC ............... 705/7; 703/27; 370/352, 68.1; 379/211.04, 45, 37, 201.1; 455/404.1, 455/456.1, 417
See application file for complete search history.

(56) References Cited

U.S. PATENT DOCUMENTS

| | | | | |
|---|---|---|---|---|
| 6,615,166 | B1* | 9/2003 | Guheen | G06Q 10/06 703/26 |
| 7,715,821 | B2* | 5/2010 | Rollender | H04M 3/42068 379/37 |
| 7,764,944 | B2* | 7/2010 | Rollender | H04M 3/42195 455/404.1 |
| 8,781,442 | B1 | 7/2014 | Link, II | |
| 8,868,028 | B1 | 10/2014 | Kaltsukis | |
| 8,942,355 | B1* | 1/2015 | Schumacher | H04W 4/90 379/45 |
| 10,009,714 | B2* | 6/2018 | Marko | H04W 76/50 |
| 2004/0107125 | A1* | 6/2004 | Guheen | G06Q 50/01 705/319 |
| 2005/0197096 | A1 | 9/2005 | Yang et al. | |
| 2005/0287979 | A1* | 12/2005 | Rollender | H04W 76/50 455/404.1 |
| 2006/0104430 | A1* | 5/2006 | Kirkland | H04M 3/46 379/211.04 |
| 2006/0189303 | A1* | 8/2006 | Rollender | H04M 3/42068 455/417 |
| 2006/0229105 | A1 | 10/2006 | Kim et al. | |
| 2007/0218925 | A1 | 9/2007 | Islam et al. | |
| 2008/0227427 | A1 | 9/2008 | Kadavallur et al. | |
| 2009/0197564 | A1 | 8/2009 | Dunn et al. | |
| 2011/0051719 | A1* | 3/2011 | Jung | H04M 3/42042 370/352 |
| 2011/0076982 | A1 | 3/2011 | Li et al. | |
| 2014/0024331 | A1 | 1/2014 | Hsu et al. | |
| 2014/0213214 | A1* | 7/2014 | Reis | H04W 4/02 455/404.2 |
| 2014/0273912 | A1* | 9/2014 | Peh | H04W 4/90 455/404.1 |
| 2014/0279818 | A1* | 9/2014 | Jiang | G06N 5/048 706/52 |
| 2014/0295885 | A1* | 10/2014 | Marko | H04W 76/50 455/456.1 |
| 2015/0105040 | A1* | 4/2015 | Ionescu | H04W 4/90 455/404.1 |
| 2015/0111517 | A1* | 4/2015 | Kowalewski | H04L 65/1069 455/404.1 |
| 2015/0348337 | A1* | 12/2015 | Choi | G07C 5/08 701/31.5 |
| 2019/0007819 | A1* | 1/2019 | Marchiol | H04W 4/44 |
| 2019/0069127 | A1* | 2/2019 | Marko | H04W 76/50 |

FOREIGN PATENT DOCUMENTS

| | | |
|---|---|---|
| CN | 1845561 A | 10/2006 |
| CN | 1845564 A | 10/2006 |
| CN | 1909718 A | 2/2007 |
| CN | 1933656 A | 3/2007 |
| CN | 103493521 A | 1/2014 |
| CN | 103945354 A | 7/2014 |
| EP | 2888919 B1 | 7/2015 |
| WO | 2008006055 A2 | 1/2008 |
| WO | 2009100638 A1 | 8/2009 |
| WO | 2013153746 A1 | 10/2013 |

\* cited by examiner

METHOD AND DEVICE FOR EXECUTING EMERGENCY CALL

CROSS REFERENCE TO RELATED APPLICATIONS

The present application claims priority under 35 U.S.C. § 365 to International Patent Application No. PCT/CN2014/091915 filed Nov. 21, 2014, which is incorporated herein by reference into the present disclosure as if fully set forth herein.

TECHNICAL FIELD

The present invention relates to the field of communications technologies, and in particular, to a method and device for executing an emergency call.

BACKGROUND

Emergency calls refer to dialing alarm or emergency numbers on a mobile phone. Due to the urgency of these numbers, the emergency calls are allowed to use any available network at that time, so as to be connected at a fastest speed, or even connected within a specified time as required. For example, the T-Mobile requires that an emergency call should be connected within six seconds.

Figure 1:
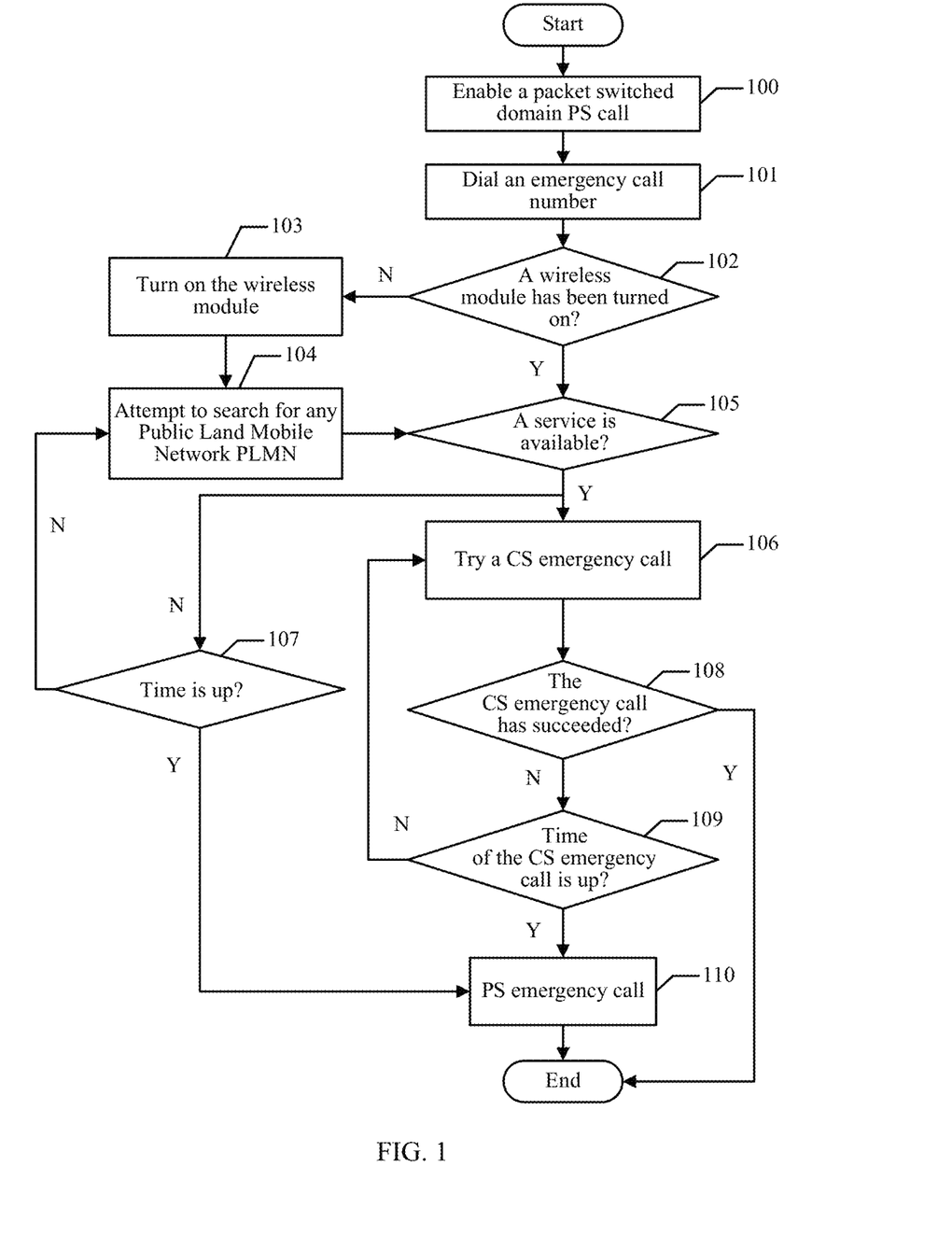
FIG. 1 is a schematic flowchart of executing an emergency call in the prior art.

Manners of making an emergency call in the prior art include: if multiple call modes coexist, an emergency call user selects a mode to make a call, or a mobile phone automatically attempts to make a call. In the prior art, to manually select an emergency call mode causes an inflexible operation and poor user experience. In automatic dialing, a mobile phone first selects a network and attempts to make a call, and when the attempt fails, selects another network to make a call, as shown in FIG. 1. The manners of making an emergency call in the prior art are inflexible, time-consuming, and easily cause inconvenient delays.

SUMMARY

Embodiments of the present invention provide a method and device for executing an emergency call, so as to implement concurrent call attempts in multiple emergency call modes, improve a connection speed of an emergency call, and reduce a connection time of the emergency call.

A first aspect of the embodiments of the present invention provides a method for executing an emergency call, and the method may include:

receiving an emergency call request;

initiating, according to the emergency call request, n emergency calls by simultaneously using n call modes, where n is an integer not less than 2; and when a connection is established for one of the n emergency calls, releasing other emergency calls for which no connection has been established.

With reference to the first aspect, in a first possible implementation manner, where the initiating n emergency calls by simultaneously using n call modes includes:

creating n call objects, and separately initiating emergency calls to underlying protocol stacks corresponding to the n call objects.

With reference to the first possible implementation manner of the first aspect, in a second possible implementation manner, the releasing other emergency calls for which no connection has been established when a connection is established for one of the n emergency calls includes:

when an answering response of any one of the n call objects is received, establishing a connection for an emergency call by using the corresponding underlying protocol stack, and releasing other emergency calls for which no connection has been established; or when answering responses of at least two of the n call objects are received, determining a corresponding underlying protocol stack according to preset priorities, establishing a connection for an emergency call by using the determined underlying protocol stack, and releasing other emergency calls for which no connection has been established.

With reference to any one of the first aspect to the second possible implementation manner of the first aspect, in a third possible implementation manner, the call mode includes: at least one of a circuit switched domain voice call, a Long Term Evolution network voice call, and a Wireless Fidelity network voice call.

With reference to any one of the first possible implementation manner of the first aspect to the third possible implementation manner of the first aspect, in a fourth possible implementation manner, the method further includes:

setting priorities of the n call objects, where the priorities are used to indicate an order of connection establishment when answering responses of the n call objects are received at the same time.

A second aspect of the embodiments of the present invention provides a device for executing an emergency call, and the device may include:

a receiving module, configured to receive an emergency call request;

a call module, configured to initiate, according to the emergency call request received by the receiving module, n emergency calls by simultaneously using n call modes, where n is an integer not less than 2; and a connection module, configured to: when a connection is established for one of the n emergency calls, release other emergency calls for which no connection has been established.

With reference to the second aspect, in a first possible implementation manner, the call module is specifically configured to:

create n call objects, and separately initiate emergency calls to underlying protocol stacks corresponding to the n call objects.

With reference to the first possible implementation manner of the second aspect, in a second possible implementation manner, the receiving module is further configured to receive answering responses of the underlying protocol stacks corresponding to the n call objects; and the connection module is specifically configured to:

when the receiving module receives an answering response of any one of the n call objects, establish a connection for an emergency call by using the corresponding underlying protocol stack, and release other emergency calls for which no connection has been established; or when the receiving module receives answering responses of at least two of the n call objects, determine a corresponding underlying protocol stack according to preset priorities, establish a connection for an emergency call by using the determined underlying protocol stack, and release other emergency calls for which no connection has been established.

With reference to any one of the second aspect to the second possible implementation manner of the second aspect, in a third possible implementation manner, the call mode includes: at least one of a circuit switched domain voice call, a Long Term Evolution network voice call, and a Wireless Fidelity network voice call.

With reference to any one of the first possible implementation manner of the second aspect to the third possible implementation manner of the second aspect, in a fourth possible implementation manner, the device further includes:

a setting module, configured to set priorities of then call objects, where the priorities are used to indicate an order of connection establishment when answering responses of the n call objects are received at the same time.

A third aspect of the embodiments of the present invention further provides a device for executing an emergency call which may include a memory and a processor, where the memory stores a set of program code, and the processor is configured to call the program code stored in the memory and execute the following operations:

receiving an emergency call request;

initiating, according to the received emergency call request, n emergency calls by simultaneously using n call modes, where n is an integer not less than 2; and when a connection is established for one of the n emergency calls, releasing other emergency calls for which no connection has been established.

With reference to the third aspect, in a first possible implementation manner, the initiating, by the processor, n emergency calls by simultaneously using n call modes includes:

creating, by the processor, n call objects, and separately initiating emergency calls to underlying protocol stacks corresponding to the n call objects.

With reference to the first possible implementation manner of the third aspect, in a second possible implementation manner, the releasing, by the processor, other emergency calls for which no connection has been established when a connection is established for one of the n emergency calls includes:

when the processor receives an answering response of any one of the n call objects, establishing, by the processor, a connection for an emergency call by using the corresponding underlying protocol stack, and releasing other emergency calls for which no connection has been established; or when the processor receives answering responses of at least two of the n call objects, determining, by the processor, a corresponding underlying protocol stack according to preset priorities, establishing a connection for an emergency call by using the determined underlying protocol stack, and releasing other emergency calls for which no connection has been established.

With reference to any one of the third aspect to the second possible implementation manner of the third aspect, in a third possible implementation manner, the call mode includes: at least one of a circuit switched domain voice call, a Long Term Evolution network voice call, and a Wireless Fidelity network voice call.

With reference to any one of the first possible implementation manner of the third aspect to the third possible implementation manner of the third aspect, in a fourth possible implementation manner, the processor is further configured to set priorities of then call objects, where the priorities are used to indicate an order of connection establishment when answering responses of the n call objects are received at the same time.

In the embodiments of the present invention, multiple emergency calls may be initiated by simultaneously using multiple emergency call modes when an emergency call request is received, and when one emergency call mode of the initiated multiple emergency calls is connected, other emergency calls are released, which can implement concurrent call attempts over multiple networks, improve a connection speed of an emergency call, and reduce a connection time of the emergency call.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Currently, there is a relatively a large quantity of manners for making a call on a mobile phone, for example, a voice call over a traditional circuit switched domain (English full name: Circuit Switched Domain, CS domain for short), a voice call over a Long Term Evolution (English full name: Long Term Evolution, LTE for short) network (English full name: Voice Over LTE, VoLTE for short), and a voice call over a Wireless Fidelity (English full name: Wireless Fidelity, WiFi for short) network (English full name: Voice Over WiFi, VoWiFi for short).

An existing method for executing an emergency call is: a terminal first tries an emergency call mode, and after the try fails, the terminal tries another emergency call mode, till the emergency call succeeds or all emergency call modes are tried. In addition, because the emergency call service is special, emergency calls are generally expected to be connected at a fastest speed, and operators have a clear requirement for a connection time of an emergency call. For example, the T-Mobile requires to connect an emergency call within six seconds. The following describes a process of executing an emergency call in the prior art with reference to FIG. 1. As shown in FIG. 1, FIG. 1 is a schematic flowchart of executing an emergency call in the prior art. The emergency call process shown in FIG. 1 includes the following steps after the process starts:

100: Enable a packet switched domain (English full name: Packet Switched Domain, PS domain for short) call.

101: Dial an emergency call number.

102: Determine whether a wireless module has been turned on; if yes, execute step 105; otherwise, execute step 103.

103: Turn on the wireless module.

104: Attempt to search for any Public Land Mobile Networks (English full name: Public Land Mobile Network, PLMN for short).

105: Determine whether a service is usable; if a result of the determining is yes, execute step 106; otherwise, execute step 107.

106: Attempt to make a CS emergency call.

107: Determine whether time is up, that is, whether an attempt time for the emergency call has expired; if a result of the determining is yes, execute step 110; otherwise, execute step 104.

108: Determine whether the CS emergency call has succeeded; if a result of the determining is yes, end the emergency call attempt, and connect the emergency call; otherwise, execute step 109.

109: Determine whether time for the CS emergency call is up, that is, whether an attempt time for the CS emergency call has expired; if yes, execute step 110; otherwise, execute step 106.

110: Attempt to make a PS emergency call.

It can be known from the foregoing that in the prior art, when making an emergency call, a terminal first tries an emergency call mode, and after the try fails, the terminal tries another emergency call mode. Multiple emergency call modes cannot be tried at the same time. That is, emergency calls in the prior art are executed in order. This usually cannot satisfy a connection time requirement of the operators, an operation manner is inflexible, and an emergency call failure easily occurs due to a problem with time. This results in a time delay that causes a user to miss the best chance or opportunity.

Figure 2:
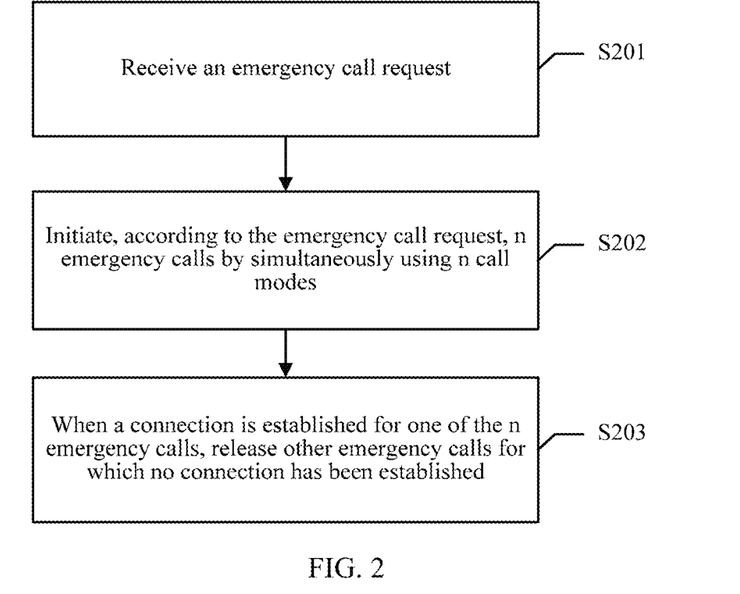
FIG. 2 is a schematic flowchart of a method for executing an emergency call according to an embodiment of the present invention.

It should be noted that: the following specifically describes a method for executing an emergency call according to an embodiment of the present invention with reference to FIG. 2. The method in FIG. 2 may be executed by a device having an emergency call function (for example: a mobile phone) or a processor (for example, a Modem), which is not limited herein. The method for executing an emergency call described in this embodiment of the present invention may be executed by the foregoing device or processor, and specifically may be executed by function modules in the device or the processor, including a receiving module, a call module, a setting module or a connection module, which is not limited herein. The following provides a specific description by using function modules of a mobile phone as an example.

Referring to FIG. 2, FIG. 2 is a schematic flowchart of a method for executing an emergency call according to an embodiment of the present invention. The method for executing an emergency call described in this embodiment includes steps as follows:

S201: Receive an emergency call request.

In some feasible implementation manners, when a user makes an emergency call with a mobile phone, the user may dial a number by using a dial pad of the mobile phone. The mobile phone can receive, by using a receiving module of the mobile phone, an emergency call request sent by a module corresponding to the dial pad of the mobile phone, and the receiving module triggers, according to the emergency call request, a call module and a connection module of the mobile phone to process the emergency call request. The receiving module, the call module, and the connection module are merely schematic modules. The receiving module, the call module, and the connection module are merely examples. Specific modules are not limited herein, and the following modules are not limited either.

S202: Initiate, according to the emergency call request, n emergency calls by simultaneously using n call modes.

In some feasible implementation manners, when the receiving module of the mobile phone receives an emergency call request, the call module can initiate n emergency calls by simultaneously using n call modes, where n is an integer not less than 2. The call modes may include: a CS voice call, an LTE network voice call, a WiFi network voice call, and the like, which are not limited herein. Specifically, the call module may create n (that is, at least two) call objects (that is, Phone objects) by using a platform mechanism such as the Android, and separately send the emergency call request to underlying protocol stacks of the n call objects, that is, the call module can initiate multiple calls to the n call objects. That is, when there are only two call networks available to the mobile phone, the call module may initiate calls to the two call networks. When there are multiple (that is, more than two) call networks available to the mobile phone, the call module can create multiple call objects by using a platform mechanism such as the Android, and initiate multiple calls to the call objects. Emergency calls are allowed to use any network because the emergency calls are special. Therefore, in the method for executing an emergency call described in this embodiment of the present invention, the call module of the mobile phone can create multiple call objects at the same time and initiate the emergency call request to the underlying protocol stacks corresponding to the multiple call objects.

In some feasible implementation manners, the call module of the mobile phone initiates multiple calls to underlying protocol stacks corresponding to then call objects. The call module may search for underlying protocol stacks corresponding to the n call objects, initiate the emergency call request to the underlying protocol stacks corresponding to then call objects, attempt to make calls, and further determine, according to a result of call attempts, a call network for putting through a call.

It should be noted that: n may be a maximum of call objects that a mobile phone can create, or a numerical value less than the maximum; n may be set according to a requirement, which is not limited herein.

S203: When a connection is established for one of the n emergency calls, release other emergency calls for which no connection has been established.

In some feasible implementation manners, after the call module attempts to make calls to the underlying protocol stacks of the n call objects, the connection module receives answering responses fed back by the underlying protocol stacks, puts through an emergency call according to the received answering responses fed back by the n underlying protocol stacks, and releases other emergency calls. Specifically, when an answering responses received by the connection module is an answering response of any one of the n call objects, the connection module may establish a connection for an emergency call by using the corresponding underlying protocol stack and release other emergency calls for which no connection has been established. Alternatively, when answering responses received by the connection module are answering responses of multiple (that is, at least two) call objects of the n call objects, the connection module determines a corresponding underlying protocol stack according to preset priorities, establishes a connection for an emergency call by using the determined underlying protocol stack, and releases other emergency calls for which no connection has been established. That is, when the connection module receives only one answering response, the connection module can connected an emergency call by using a call network corresponding to the underlying protocol stack of the answering response. When multiple call attempts succeed at the same time, that is, when the connection module receives multiple answering responses at the same time, the connection module may select, according to priorities of the call objects, a call object having a highest priority from the call objects, and connect an emergency call by using a call network corresponding to the underlying protocol stack that corresponds to the call object having the highest priority.

In some feasible implementation manners, the mobile phone can set priorities of the n call objects by using the setting module. For example, it may be set that a priority of the CS voice call is a first priority, a priority of the WiFi network voice call is a second priority, and a priority of the LTE network voice call is a third priority, where the first priority is higher than the second priority, and the second priority is higher than the third priority. In this embodiment of the present invention, the priorities are used to indicate an order of connection establishment when answering responses of the n call objects are received at the same time. For example, when underlying protocol stacks of the CS voice call, the WiFi network voice call, and the LTE network voice call respond at the same time, an order of connection establishment for the foregoing three call objects is: selecting the CS voice call first, then the WiFi network voice call next, and finally the LTE network voice call.

In some feasible implementation manners, after the connection module puts through the emergency call by using the call network corresponding to the selected underlying protocol stack, other call attempts for which no connection has been established may be canceled. Specifically, calls sent to other call objects (except the call object to which a connection has been established) may be disconnected, and emergency calls corresponding to other call objects (except the call object to which a connection has been established) are released. For example, after the call module initiates multiple calls to a first call object (the call mode is CS voice call), a second call object (the call mode is WiFi network voice call), and a third call object (the call mode is LTE network voice call) at the same time, the connection module receives an answering response fed back by an underlying protocol stack corresponding to the first call object, and after the connection module establishes a connection by using a general network corresponding to an underlying protocol stack of the first call object, the connection module may cancel a call sent to an underlying protocol stack corresponding to the second call object and a call sent to an underlying protocol stack corresponding to the third call object.

It should be noted that S201 to S203 may be executed by a device having an emergency call function (for example: a mobile phone) or a processor (for example, a Modem), which is not limited herein.

In this embodiment of the present invention, when receiving an emergency call request of a mobile terminal, a mobile phone may create multiple call objects, initiate multiple emergency calls to underlying protocol stacks of the call objects, and connect, according to an answering response of an underlying protocol stack, to a call network corresponding to the underlying protocol stack that feeds back the answering response, so that an emergency call is connected. Further, call attempts made by using unselected call networks may be canceled, to release other call networks. That is, this embodiment of the present invention can implement concurrent call attempts in multiple emergency call modes, improve a connection speed of an emergency call, and reduce a connection time of the emergency call.

Figure 3:
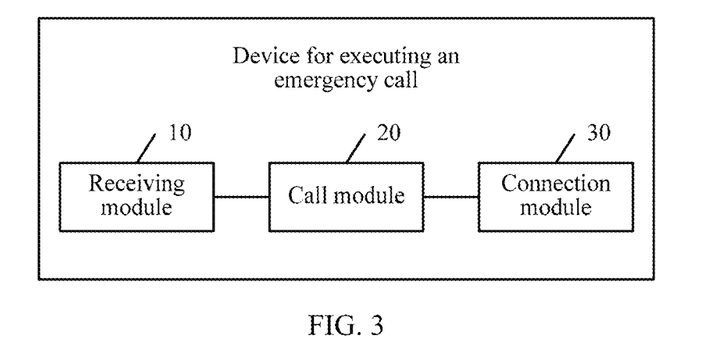
FIG. 3 is a schematic structural diagram of a device for executing an emergency call according to an embodiment of the present invention.
Figure 4:
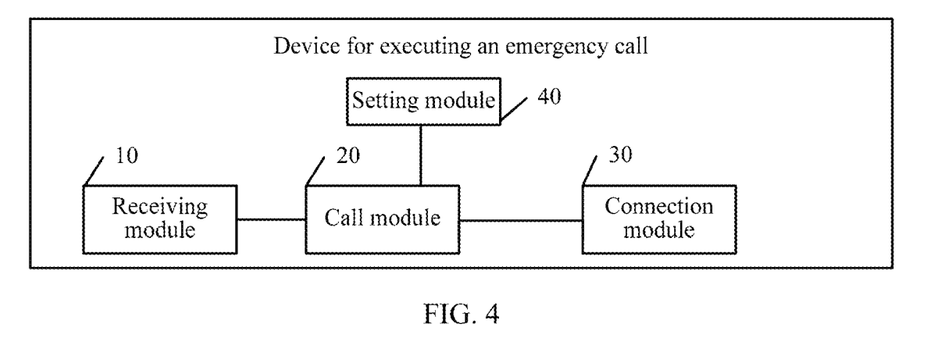
FIG. 4 is another schematic structural diagram of a device for executing an emergency call according to an embodiment of the present invention.

Referring to FIG. 3, FIG. 3 is a schematic structural diagram of a device for executing an emergency call according to an embodiment of the present invention. The device for executing an emergency call according to this embodiment of the present invention may include:

an answering module 10, configured to receive an emergency call request;

a call module 20, configured to initiate, according to the emergency call request received by the receiving module, n emergency calls by simultaneously using n call modes, where n is an integer not less than 2; and a connection module 30, configured to: when a connection is established for one of the n emergency calls, release other emergency calls for which no connection has been established.

In some feasible implementation manners, the foregoing call module 20 is specifically configured to:

create n call objects, and separately initiate emergency calls to underlying protocol stacks corresponding to the n call objects.

In some feasible implementation manners, the foregoing receiving module 10 is further configured to receive answering responses of the underlying protocol stacks corresponding to the n call objects; and the foregoing connection module 30 is specifically configured to:

when the receiving module receives an answering response of any one of the n call objects, establish a connection for an emergency call by using the corresponding underlying protocol stack, and release other emergency calls for which no connection has been established; or when the receiving module receives answering responses of at least two of the n call objects, determine a corresponding underlying protocol stack according to preset priorities, establish a connection for an emergency call by using the determined underlying protocol stack, and release other emergency calls for which no connection has been established.

Figure 5:
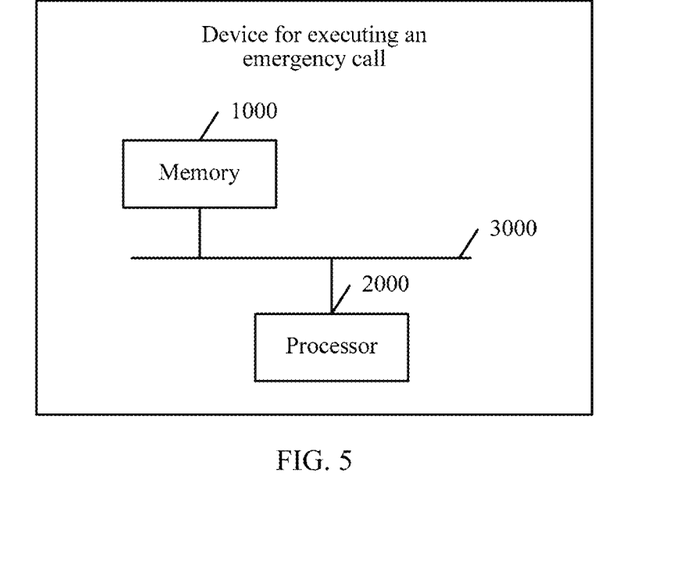
FIG. 5 is another schematic structural diagram of a device for executing an emergency call according to an embodiment of the present invention.

In some feasible implementation manners, the device for executing an emergency call according to this embodiment of the present invention (as shown in FIG. 5) further includes:

a setting module 40, configured to set priorities of the n call objects, where the priorities are used to indicate an order of connection establishment when answering responses of the n call objects are received at the same time.

In a specific implementation, the device for executing an emergency call according to this embodiment of the present invention may specifically be a device having an emergency call function (for example, a mobile phone) or a processor (for example, a Modem), and this embodiment of the present invention is specifically described by using a mobile phone as an example. In the specific implementation, the device for executing an emergency call according to this embodiment of the present invention can execute specific implementation manners of the method for executing an emergency call according to the foregoing embodiment of the present invention. For a specific implementation process, refer to steps S201 to S203 in the foregoing embodiment. Details are not described herein again.

Referring to FIG. 5, FIG. 5 is another schematic structural diagram of a device for executing an emergency call according to an embodiment of the present invention. The device according to this embodiment of the present invention includes: a memory 1000 and a processor 2000, where the memory 1000 and the processor 2000 are connected by using a bus 3000.

The foregoing memory 1000 stores a set of program code, and the foregoing processor 2000 is configured to call the program code stored in the foregoing memory 1000 and execute the following operations:

receiving an emergency call request;

initiating, according to the received emergency call request, n emergency calls by simultaneously using n call modes, where n is an integer not less than 2; and when a connection is established for one of the n emergency calls, releasing other emergency calls for which no connection has been established.

In some feasible implementation manners, the initiating, by the processor 2000, n emergency calls by simultaneously using n call modes includes:

creating, by the processor, n call objects, and separately initiating emergency calls to underlying protocol stacks corresponding to the n call objects.

In some feasible implementation manners, the releasing, by the processor 2000, other emergency calls for which no connection has been established when a connection is established for one of the n emergency calls includes:

when the processor 2000 receives an answering response of any one of the n call objects, establishing, by the processor 2000, a connection for an emergency call by using the corresponding underlying protocol stack, and releasing other emergency calls for which no connection has been established; or when the processor 2000 receives answering responses of at least two of the n call objects, determining, by the processor 2000, a corresponding underlying protocol stack according to preset priorities, establishing a connection for an emergency call by using the determined underlying protocol stack, and releasing other emergency calls for which no connection has been established.

In some feasible implementation manners, the foregoing processor 2000 is further configured to set priorities of the n call objects, where the priorities are used to indicate an order of connection establishment when answering responses of the n call objects are received at the same time.

In a specific implementation, the device according to this embodiment of the present invention may be a device having an emergency call function (for example, a mobile phone) or a processor (for example, a Modem), and this embodiment of the present invention is specifically described by using a mobile phone as an example. In the specific implementation, modules (including the memory and the processor) in the device according to this embodiment of the present invention can execute specific implementation manners of the method for executing an emergency call according to the foregoing embodiment of the present invention. For a specific implementation process, refer to steps S201 to S203 in the foregoing embodiment. Details are not described herein again.

In addition, an embodiment of the present invention further provides a computer readable medium, including a computer readable instruction that performs the following operations when being executed: executing steps S201 to S203 in the foregoing embodiment. Details are not described herein again.

In addition, an embodiment of the present invention further provides a computer program product, including the foregoing computer readable medium.

The function modules in the embodiments of the present invention may be integrated in a processing module, or the modules may physically exist separately, or two or more modules may be integrated in one module. The foregoing integrated module may be implemented in a hardware form or a form of a software function module. When implemented in the form of a software function module and sold or used as an independent product, the integrated module may be stored in a computer readable storage medium.

In the embodiments of the present invention, descriptions with reference to terms such as "an embodiment", "some embodiments", "example", "a specific example", or "some examples" mean that specific features, structures, materials or characteristics that are described with reference to the embodiment or the example are contained in at least one embodiment or example of the present invention. In the specification, schematic descriptions of the foregoing terms do not need to be specific to a same embodiment or example. Besides, the specific features, structures, materials or characteristics that are described may be properly combined in any one or more embodiments or examples. In addition, a person skilled in the art may integrate or combine different embodiments or examples described in the specification and features of the different embodiments or examples as long as they are not contradictory to each other.

In the embodiments of the present invention, the "computer readable medium" may be any devices that can contain, store, communicate with, propagate, or transmit a program for use by an instruction executing system or device or can be used with the instruction executing system or device. More detailed examples of the computer readable medium (non-exhaustive list) include: an electrical connection portion (electronic device) having one or more wirings, a portable computer disk (magnetic device), a random access memory (RAM), a read-only memory (ROM), an erasable programmable read only memory (EPROM or a flash memory), an optical fiber device, and a portable compact disc read-only memory (CDROM). In addition, the computer readable medium even may be paper or other appropriate media on which the program may be printed, because the program may be obtained electronically by scanning optically the paper or other appropriate media and then compiling, interpreting, or processing in other appropriate manners, as necessary, and then the program is stored in the computer memory.

It should be understood that each part of the present invention can be implemented by using hardware, software, firmware, or a combination thereof. In the foregoing implementation manner, multiple steps or methods can be implemented by using software or firmware stored in a memory and executable by an appropriate instruction execution system. For example, if implemented by hardware, same as another implementation manner, the implementation manner may be implemented by using any one or a combination of the following technologies that are known in the art: a discrete logic circuit having a logic gate circuit configured to implement a logic function on a data signal, an application-specific integrated circuit having an appropriate combined logic gate circuit, a programmable gate array (PGA), a field programmable gate array (FPGA), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A method for executing an emergency call, the method comprising:
receiving an emergency call request;
initiating, according to the emergency call request, emergency calls according to the emergency call request simultaneously, wherein the emergency calls includes a first emergency call and a second emergency call, the first and emergency call being initiated on a first communications network and the second emergency call being initiated on a second communications network, the first communications network being separate and distinct from the second communications network;
establishing a network connection for at least one of the emergency calls; and
releasing the other emergency calls for which no network connection has been established; and, wherein initiating n emergency calls simultaneously comprises:
initiate each emergency call using a respective underlying protocol stack; and
establishing the connection for one of the emergency calls comprises:
when answering responses of at least two of the n emergency calls are received, determining a corresponding underlying protocol stack according to preset priorities, and establishing the connection using the determined underlying protocol stack.

2. The method according to claim 1, wherein establishing the connection for one of the emergency calls comprises:
when an answering response of any one of the n emergency calls is received, establishing the connection using the respective underlying protocol stack.

3. The method according to claim 1, wherein the first or the second communications network is a circuit switched domain voice call, a Long Term Evolution (LTE) network voice call, or a Wireless Fidelity (WiFi) network voice call.

4. The method according to claim 1, further comprising:
setting priorities of the calls, wherein the priorities are used to indicate an order of connection establishment when answering responses calls that are received at the same time.

5. A device for executing an emergency call, the device comprising:
a memory configured to store program code; and
a processor configured to call the program code stored in the memory which, when executed by the processor, causes the device to:
receive an emergency call request,
initiate, according to the received emergency call request, emergency calls according to the emergency call request simultaneously, wherein the emergency calls includes a first emergency call and a second emergency call, the first and emergency call being initiated on a first communications network and the second emergency call being initiated on a second communications network, the first communications network being separate and distinct from the second communications network;
establish a network connection for at least one of the emergency calls, and
release the other emergency calls for which no network connection has been established; and, wherein the program code, when executed by the processor, further causes the device to:
initiate each emergency call using a respective underlying protocol stack;
when the processor receives answering responses of at least two of the n emergency calls, determine a corresponding underlying protocol stack according to preset priorities; and
establish the connection using the determined underlying protocol stack.

6. The device according to claim 5, wherein the program code, when executed by the processor, further causes the device to:
when the processor receives an answering response of any one of the n emergency calls, establish the connection using the respective underlying protocol stack.

7. The device according to claim 5, wherein the first or the second communications network is a circuit switched domain voice call, a Long Term Evolution (LTE) network voice call, or a Wireless Fidelity (WiFi) network voice call.

8. The device according to claim 5, wherein the program code, when executed by the processor, further causes the device to:
set priorities of the calls, wherein the priorities are used to indicate an order of connection establishment when answering responses calls that are received at the same time.

9. A non-transitory computer readable medium comprising:
computer readable instructions that, when executed by a computer processor, cause the computer processor to:
receive an emergency call request;
initiate, according to the emergency call request, emergency calls according to the emergency call request simultaneously, wherein the emergency calls includes a first emergency call and a second emergency call, the first and emergency call being initiated on a first communications network and the second emergency call being initiated on a second communications network, the first communications network being separate and distinct from the second communications network;
establish a network connection for at least one of the emergency calls; and
release the other emergency calls for which no network connection has been established and, wherein the computer readable instructions, when executed by the computer processor, further cause the computer processor to:
initiate each emergency calls using a respective underlying protocol stack;
when answering responses of at least two of the n emergency calls are received, determine a corresponding underlying protocol stack according to preset priorities; and
establish the connection using the determined underlying protocol stack.

10. The non-transitory computer readable medium according to claim 9, wherein the computer readable instructions, when executed by the computer processor, further cause the computer processor to:
when an answering response of any one of the n emergency calls is received, establish the connection using the respective underlying protocol stack.

11. The non-transitory computer readable medium according to claim 9, wherein the first or the second communications network is a circuit switched domain voice call, a Long Term Evolution (LTE) network voice call, or a Wireless Fidelity (WiFi) network voice call.

12. The non-transitory computer readable medium according to claim 9, wherein the computer readable instructions, when executed by the computer processor, cause the computer processor to:
   set priorities of the calls, wherein the priorities are used to indicate an order of connection establishment when answering responses calls that are received at the same time.

* * * * *